United States Patent

Ekanadham et al.

[11] Patent Number: 5,802,288
[45] Date of Patent: Sep. 1, 1998

[54] INTEGRATED COMMUNICATIONS FOR PIPELINED COMPUTERS

[75] Inventors: Kattamuri Ekanadham, Yorktown Heights; Ronald Mraz, Millwood, both of N.Y.

[73] Assignee: International Business Machines Corporation, Armonk, N.Y.

[21] Appl. No.: 589,076

[22] Filed: Jan. 23, 1996

Related U.S. Application Data

[60] Provisional application No. 60/005,885, Oct. 26, 1995.

[51] Int. Cl.[6] .................................................. G06F 15/173
[52] U.S. Cl. ...................... 395/200.8; 395/309; 395/310; 395/872; 395/562; 395/563; 395/800.41
[58] Field of Search ............................... 395/820, 309, 395/310, 872, 562, 563, 800.41, 200.8

[56] References Cited

U.S. PATENT DOCUMENTS 4,701,845  10/1987  Andreasen et al. ............. 395/183.07
4,907,232   3/1990  Harper et al. .................... 395/182.01

OTHER PUBLICATIONS

Hamacher et al., *Computer Organization*, McGraw Hill, 1990, pp. 153, 220–221.

Tabak, *RISC Systems*, Research Studies Press Ltd., 1990, pp. 44–47.

Prohofsky, "High Speed Data Bus Macro Instruction Set Architecture," IEEE, 1991 pp. 192–196.

*Primary Examiner*—Alyssa H. Bowler
*Assistant Examiner*—John Follansbee
*Attorney, Agent, or Firm*—Whitham, Curtis & Whitham; Douglas W. Cameron, Esq.

[57] ABSTRACT

This document describes a feature that can be added to existing pipelined architectures (such as RISC) to enhance packet based or message passing communications. The feature integrates the communication interface directly into the pipeline of the processor, offering the potential to greatly reduce latency and overhead for fine grain communications. Additionally, a second interface is provided to maintain high bandwidth for large blocks of data.

10 Claims, 5 Drawing Sheets

INTEGRATED COMMUNICATIONS FOR PIPELINED COMPUTERS

CROSS-REFERENCE TO RELATED APPLICATIONS

The present application claims priority to co-pending U.S. provisional application 60/005,885 filed Oct. 26, 1995.

DESCRIPTION

BACKGROUND OF THE INVENTION

Field of the Invention

The present invention generally relates to packet based or message passing communications and, more particularly, to an enhancement to existing pipelined architectures, such as reduced instruction set computer (RISC) architectures, which integrates the communication interface directly into the pipeline of the processor, offering the potential to greatly reduce latency and overhead for fine grain communications.

Background Description

The great proliferation of desk top computers (so-called personal computers) and workstations has lead to a dramatic increase in computer networks, ranging from local area networks (LANS) to wide area networks (WANs) in which computers are interconnected by local cabling and wiring systems to long distance telephone lines. In all such networks, the computers must be connected to the network by some interface. Traditionally, the computer has been provided with a network adapter card that plugs into a bus connector that communicates with the central processing unit (CPU) of the computer. This traditional approach has speed limitations, and therefore there is ongoing research in how to improve network communications in modern computer networks.

Recent work at the University of Illinois by Lynn Choi and Andrew Chein as reported in "Integrating Networks and Memory Hierarchies in a Multicomputer Node Architecture", *IEEE Proc. of the Intl. Conf. on Parallel Processing*, 1994, pp. 10–17, October 1994, advocates a common packet interface to the memory as well as the network. While the processor pipeline is left without any changes, the memory interface is substantially changed and is novel. By packetizing this interface, memory and network are made to look similar to the processor.

Recent work at Stanford University by John Heinlein, Kourosh Gharachorloo, Scott Dresser, and Anoop Gupta, as reported in "Integration of Message Passing and Shared Memory in the Stanford FLASH Multiprocessor", *IEEE Sixth Int. Conf. on Architectural Support for Programming Languages and Operating Systems*, utilizes a special purpose chip, called the Magic chip, that is the sole interface to the processor. All memory requests (beyond the cache) must go through the Magic chip, which performs local cache fills as well as remote memory fetches. The Magic chip interfaces with the network and is fully programmable so that a variety of protocols can be implemented, such as coherent global memory, message passing, active messages, etc.

Recent work at MIT by Arvind as reported in "StarT the Next Generation: Integrating Global Caches and Dataflow Architecture", *MIT Laboratory for Computer Science*, CSG Memo 354, February 1994, proposes minimal modifications to a processor and builds a network interface that appears to the processor as special memory, in a manner similar to the Stanford approach.

While the research reported above provides improved performance in computer networks, there remains a need for even greater performance improvements.

SUMMARY OF THE INVENTION

It is therefore an object of the present invention to provide a feature which may be added to existing pipelined architectures to enhance packet based or message passing communications.

According to the invention, there is provided an integrated pipeline network interface having a message passing interface directly coupled with the execution pipeline of the CPU. The pipeline interface of the communications architecture accesses packet communications through separate first-in, first-out (FIFO) registers, viewed as virtual registers. This allows the CPU to view the communication hardware as read/write registers offering maximum bandwidth and minimum latency for fine grain packet communications under program control. To efficiently handle large block communications, a direct memory access (DMA) memory interface is provided. This path is used when the amount of data to be transferred is large enough to justify the use of coherence mechanisms rather than storing data through the cache.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
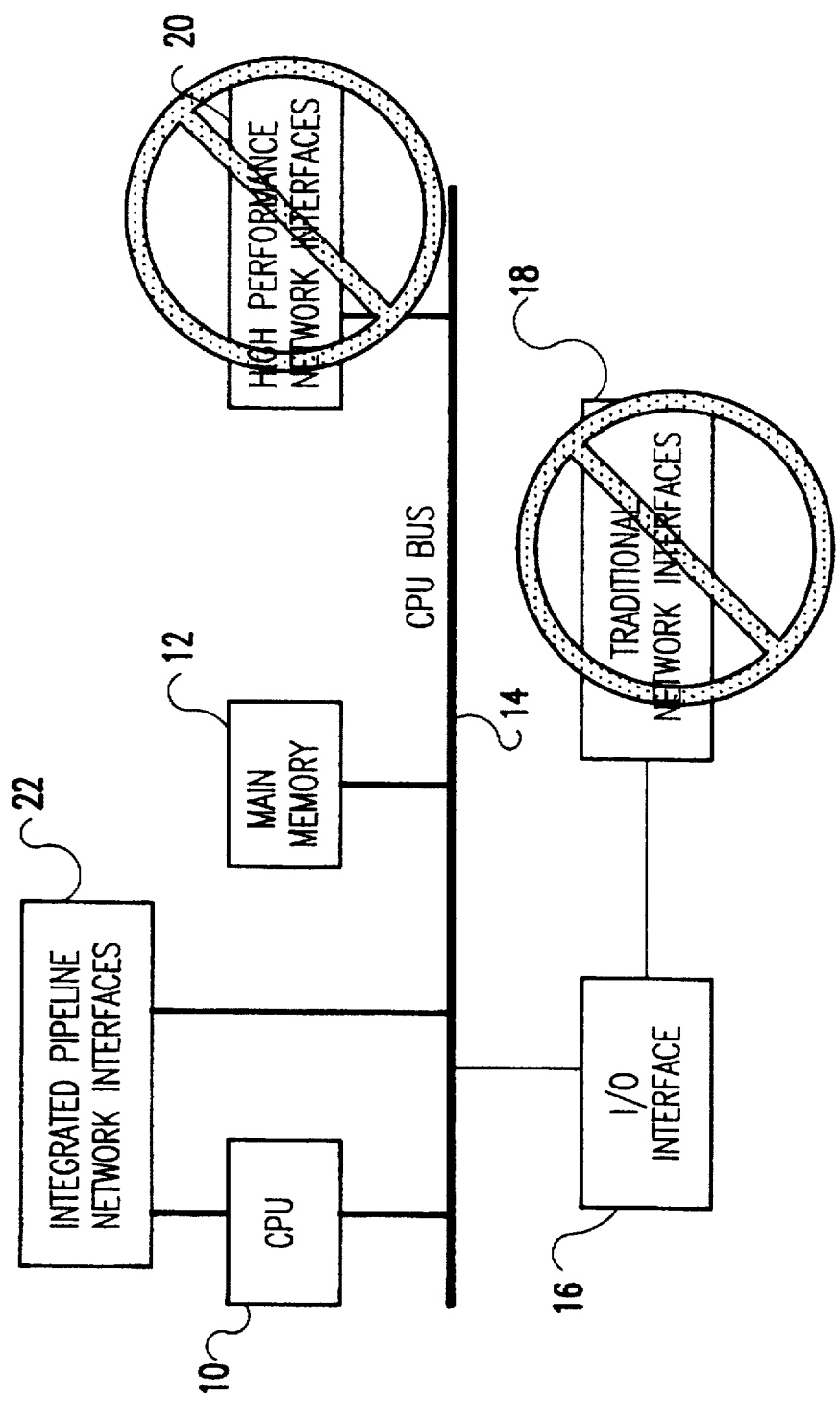
FIG. 1 is a high level block diagram providing a graphical illustration of RISC processor I/O connections.

Referring now to the drawings, and more particularly to FIG. 1, there is shown the main functional blocks of a reduced instruction set computer (RISC) architecture, such as the IBM PowerPC® microprocessor, as it relates to network interfaces. Additional information on the PowerPC® microprocessor may be had by reference to *The PowerPC Architecture and The RISC System/6000 PowerPC System Architecture*, both published by Morgan Kaufmann Publishers.

The central processing unit (CPU) 10 is connected to supporting memory 12 via a CPU bus 14, which in the PowerPC® microprocessor is termed the 60X or 6XX bus. Also connected to bus 14 is an input/output (I/O) interface 16 that in existing implementations may be ISA (industry standard architecture, an IEEE standard), PCI (peripheral component interconnect) or IBM's Micro Channel interfaces. Additional information on the ISA interface may be had by reference to the book by Tom Shanley and Don Anderson entitled *ISA System Architecture*, Mindshare Press (1993), and additional information on the PCI interface may be had by reference to the book by Tom Shanley and Don Anderson entitled *PCI System Architecture*, Mindshare Press (1994). IBM's MicroChannel interface was developed for IBM's PS/2 line of personal computers and function as either a 16-bit or 32-bit bus with multiple bus master processors.

Three methods of interfacing a network with the computing system are shown in FIG. 1. The two traditional interfaces (shown as crossed out) are I/O interface connected devices 18 and memory based interfaces 20 connected to the bus 14. An I/O interface presents the network as a specialized memory space to the CPU. Access to locations in this space is usually at a higher granularity; e.g., at least a few words. The interface usually has a long latency requiring some negotiation during setup. But once it is setup, it transfers data at a higher rate. Minimal protection is provided for the accesses; i.e., only simple controls like having or not having access to this memory space. The memory based interfaces are implemented by high speed adapters. They do provide a low latency interface to the processor, as they directly monitor the memory bus and can service requests to the address space designated for them. Data is buffered in the adapters and direct memory access (DMA) controllers transfer data between them and memory.

In these traditional designs, substantial overhead is incurred in both hardware and software to maintain consistency between levels of the memory hierarchy. Additionally, coordination and protocols must be provided to insure correct and responsive operation of the communications interface. These stumbling blocks are eliminated in present invention, shown as the integrated pipeline network interface 22 in FIG. 1. Here, the message passing interface is directly coupled with the execution pipeline of the CPU 10.

Figure 2:
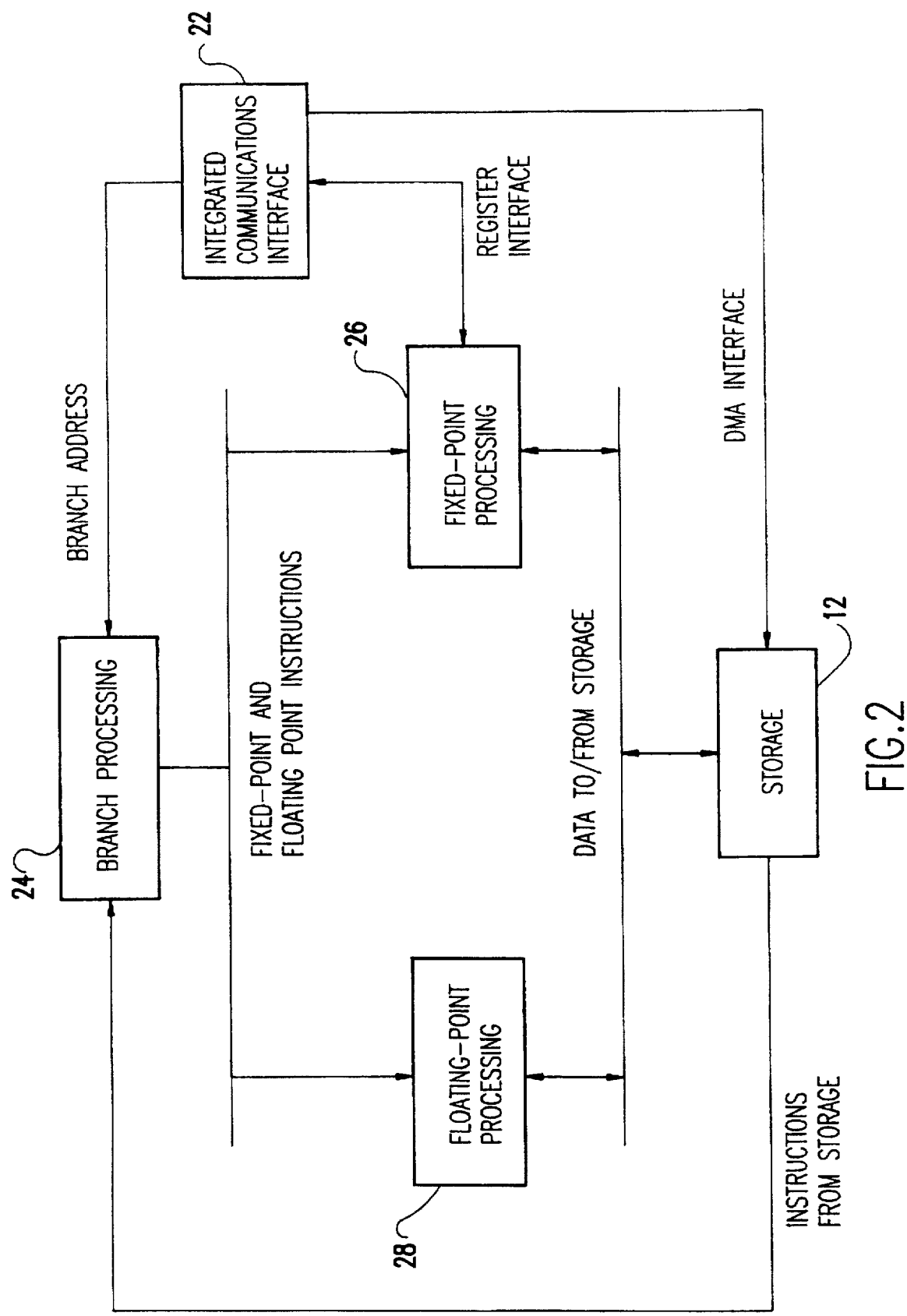
FIG. 2 is a block diagram illustrating the logical processing model of the invention.

FIG. 2 provides a block diagram which shows how the integrated pipeline network interface is coupled into the pipeline of a RISC processor. The model is again that of the IBM PowerPC® microprocessor. The CPU comprises a branch processing unit 24, fixed-point processing unit 26, and floating-point processing unit 28. Instructions from main memory 12 are supplied to the branch processing unit 24, and fixed-point and floating-point instructions are directed to the fixed-point processing unit 26 or the floating-point processing unit 28, as appropriate. Note that the interface 22 is shown to be part of the fixed-point processing unit 26. The interface 22 communicates with main memory 12 via a DMA interface.

The interface 22 itself is seen as a set of registers that provide both control and data movement. The pipeline interface of the communications architecture, according to a preferred embodiment of the invention, accesses packet communications through separate first-in, first-out (FIFO) registers, viewed as virtual registers. This allows the CPU to view the communication hardware as read/write registers offering maximum bandwidth and minimum latency for fine grain packet communications under program control. To efficiently handle large block communications, a DMA memory interface is provided. This path is used when the amount of data to be transferred is large enough to justify the use of coherence mechanisms rather than storing data through the cache.

Figure 3:
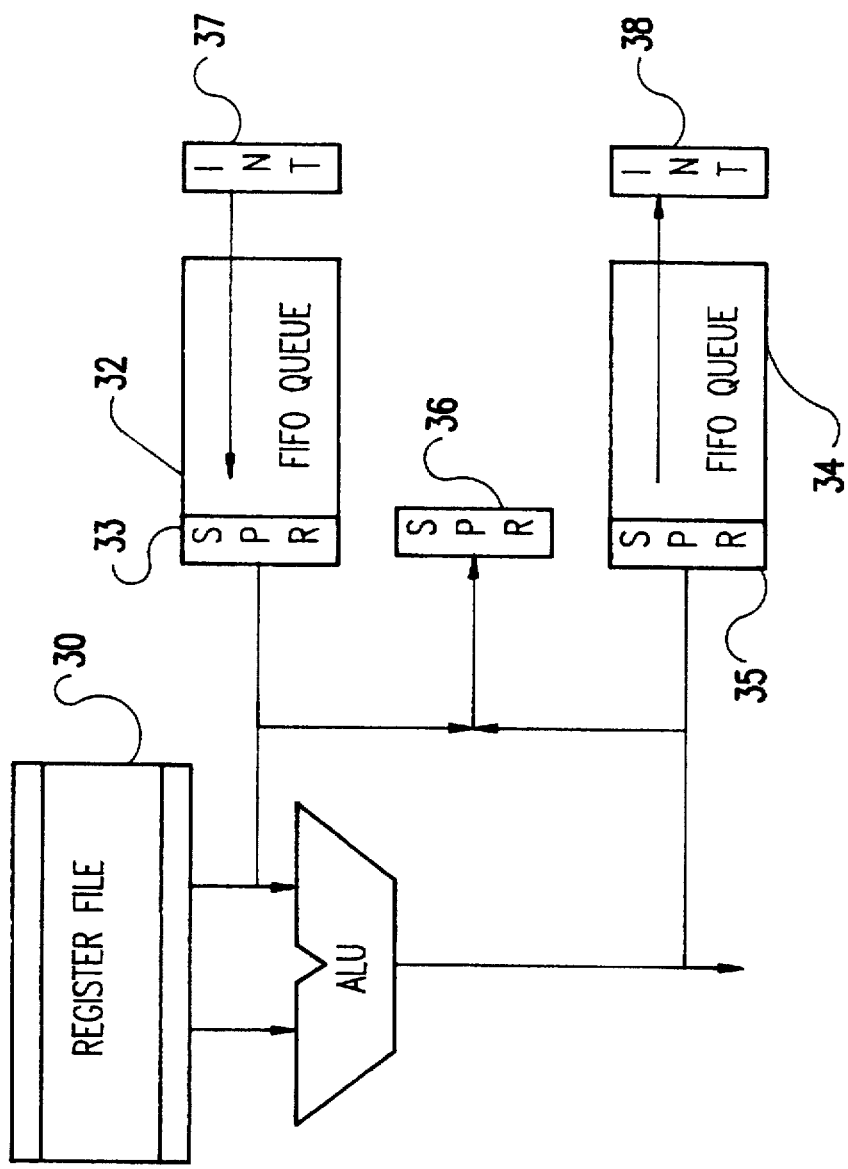
FIG. 3 is a block diagram of the integrated communication for pipelined processors according to the invention.

FIG. 3 shows the arithmetic logic unit (ALU) of the fixed-point processing unit 26 of the RISC pipeline having concurrent access to the register file 30. The invention provides an interface to communication FIFO queues 32 and 34 within the execution pipeline. In addition, such a processor architecture has several special purpose registers (SPRs) with special load/store instructions to manipulate them. These SPRs are typically used for interrupt handling, fast memory-memory transfers and other functions. One SPR 36, a read/write status register, is shown as illustrative and is used to control load/unload operations of the FIFOs 32 and 34. Our extension to the processor augments the use of the special purpose registers (SPRS) in the following manner.

The integrated communications interface can detect the presence of an incoming message in one of several ways. The preferred use is programmed into the message header and can include a field defining the mode of operation, either polling, interrupt or vectored interrupt. First, detection can be done simply by polling of the interface to determine if a packet has arrived. This is known to be useful in parallel processing applications that run on SP2 class machines. Interrupt processing can be used in several ways. One way is simply to enable an interrupt line every time that a message arrives. Another novel approach is the full integration of a vectored interrupt into the processor pipeline. This is the ability to branch to the virtual address contained as the first word of the message. This new machine instruction would branch unconditionally to the address represented by the first data word of the message. This is done by simply inserting a fictitious Branch—and—Link instruction to a specified address into the instruction stream. The code at this location would then be useful for processing subsequent data contained in the message. This is a novel feature to implement "transparent" thread switching in a processor. The service code at this address must be crafted so as not to disturb the state of the machine at all when returning to the original context. Additionally, implementation requires that the address which is issued is a system wide virtual address, so that the translation mechanism can map the address independently of context. Finally, additional modes of communication are reserved for additional mechanisms, an example being Mode-DMA in which the data is simply streamed into an adapter that implements a virtual DMA interface to memory.

As shown in FIG. 3, two queues 32 and 34 are provided as part of the integrated network interface. The head of each queue appears to the CPU as a special purpose register (SPR) 33 and 35, respectively. The tail end of each queue has the network interfaces (INT) 37 and 38, respectively, which provides the physical connections to the integrated pipeline network interfaces. They are required since these would typically be the CPU chip interfaces and may not be the full width of the microprocessor word. Message packets of multiple words would fill the FIFO queue. At a predetermined threshold, the CPU would be informed of the data by the setting of a flag (polling operation) or interrupt (event driven operation). When the CPU wishes to receive the information, it reads (load operation) a special purpose register that is in-line with the pipeline. Reading of the SPR could be destructive or non-destructive, depending on the SPR number. This allows software to examine the leading word which typically contains information about the message's origin and the actions required to process the message. Destructive reads of the head automatically advances the queue by one entry, thus providing a means for reading a message. To send a message, the CPU would simply write (store operation) multiple words to the SPR that is connected to the outgoing FIFO register 34. Typically, the first word of the packet would contain routing information necessary to reach the intended destination as well as source information.

Figure 4:
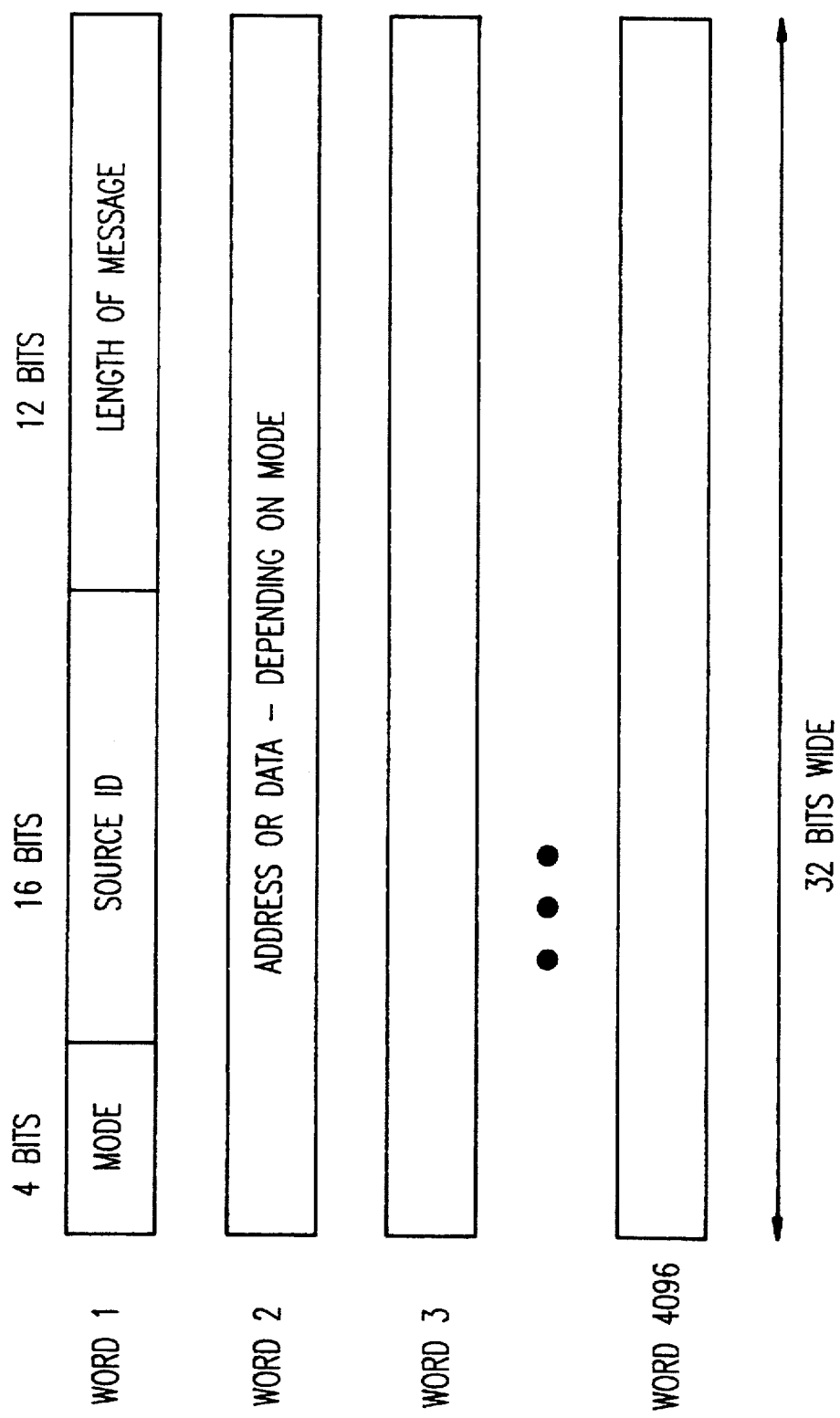
FIG. 4 is a diagram illustrating the communication packet description of the invention.

A mode of the communication packet is provided in FIG. 4. The first word, Word 1, is considered a header and contains four bits identifying the mode of operation, sixteen bits providing the sender's ID, and twelve bits defining the length of the message for future reference. If the mode is "vectored interrupt", the branch processing unit 24 (FIG. 2) would read Word 2 directly from the FIFOs (first-in, first-out registers) 32 and 34 and use this as the target address for branching. Otherwise, Word 2 to Word 4096 are considered data. Subsequent reads from the SPR register causes the FIFO to update or unload the FIFO to the SPR, thus allowing the CPU to read the message. An additional DMA capability can be provided in an additional CPU instruction to directly DMA the FIFO data directly to main memory without going through the CPU at all.

An interrupt driven micro-kernel is required to manage the environment that is defined above. This level of control is required to efficiently resolve synchronization and ownership issues within the parallel machine. Such a kernel could be provided by commercially available operating systems including AIX 4.1 (IBM's version of UNIX and Windows NT (published by Mircosoft). These kernels offer the potential to respond to network events with low latency and are structured to allow the addition of our global memory management extension with minimal impact on performance.

Figure 5:
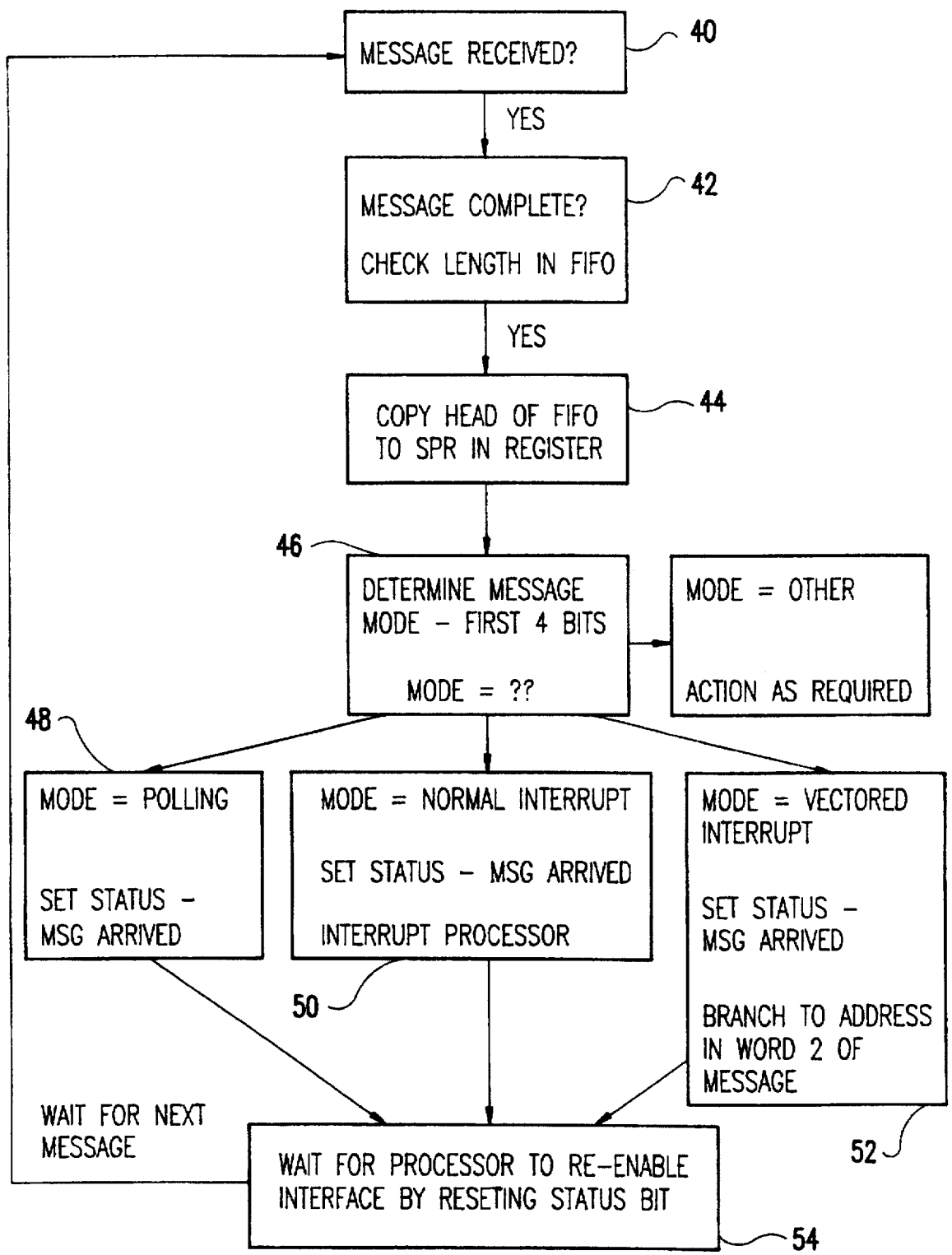
FIG. 5 is a state machine diagram showing the logic of the operation of the invention.

FIG. 5 provides a state diagram of how data is received. Once a complete message is received, as determined in block 40, a check is made in block 42 to determine if the message is complete. If so, Word 1 is copied to the SPR IN register 32 in block 44. A check is then made in block 46 to determine the mode in the first four bits of the message. Depending on the mode of operation, an interrupt or an unconditional branch operation would be invoked. Specifically, if the mode is polling, then the status is set indicating that a message has arrived in block 48. If the mode is normal interrupt, then the status is set indicating that a message has arrived and invoking the interrupt processor of the computer in block 50. If the mode is vectored interrupt, then the status is set indicating that a message has arrived in invoking a branch operation to the address in Word 2 of the message in block 52. This mode enables a transparent thread switching in the computer. If the mode is other than these three, as determined in block 54, other processing action is invoked as may be appropriate. Finally, when the CPU has processed the message, the status register is updated in block 56 to reflect that a new message can now be received.

The invention thus provides a communications interface that does not require buffering of the data in memory for transfer. This is truly a "zero-copy" interface without using memory. Although a generic packet switched interface has been described, this interface can be easily adapted to the 48-byte mode of asynchronous transfer mode (ATM) networks. Thus, while the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An integrated communication interface for a pipelined computer connected to a network, said computer having a CPU, a CPU bus and a main memory, comprising:

a first first-in, first-out (FIFO) register having an input connected to a first network interface and an output connected to a first point in an execution pipeline of the computer CPU;

a second FIFO register having an input connected to a second point in the execution pipeline of the computer CPU the second point being later in the pipeline than the first point, and an output connected to a second network interface, said first and second FIFOs being viewed by the computer CPU as virtual registers and providing an integrated network interface directly coupled to said execution pipeline of said computer CPU without using said computer CPU bus or said computer main memory; and means for notifying the computer that the first FIFO contains message packets received from the network, the computer loading message packets in the first FIFO in a first special purpose register (SPR) that is in-line with the pipeline to read the message packets and writing message packets to a second special purpose register (SPR) connected to the second FIFO, wherein said computer CPU is augmented with special load/store instructions to manipulate said first and second SPRs.

2. The integrated communication interface for a pipelined computer as recited in claim 1 wherein the head end of each of said first and second FIFOs is respectively connected to said first and second special purpose register (SPRs) of a processing unit of the pipelined computer and the tail end of each of said first and second FIFOs is connected to respectively receive and feed communication data packets to said respective first and second network interfaces.

3. The integrated communication interface for a pipelined computer as recited in claim 2 wherein said processing unit of the pipelined computer is a fixed-point processing unit.

4. The integrated communication interface for a pipelined computer as recited in claim 2 wherein the first special purpose register (SPR) connected to the head end of the first FIFO is connected to an input of an arithmetic processing unit (ALU) of the fixed-point processing unit and the second special purpose register (SPR) connected to the head end of the second FIFO is connected to an output of the ALU.

5. The integrated communication interface for a pipelined computer as recited in claim 1 wherein a communication packet includes a header defining a mode of a message, the mode including one of polling and normal interrupt, said means for notifying the computer setting a status that a message has been received if the mode is polling or setting a status that a message has been received and notifying an interrupt processor of the computer if the mode is normal interrupt.

6. The integrated communication interface for a pipelined computer as recited in claim 5 wherein the mode further includes vectored interrupt, said means for notifying the computer setting a status that a message has been received and branching to an address in the message if the mode is vectored interrupt.

7. A communications interface directly coupled to the execution pipeline of a reduced instruction set computer (RISC) having an arithmetic logic unit (ALU) reading and writing to a plurality of special purpose registers (SPRs), a CPU bus and a main memory, said communications interface comprising:

a first first-in, first-out (FIFO) queue connected to an input of the pipeline such that said ALU reads from said first FIFO queue as a virtual special purpose register (SPR);

a second first-in, first-out (FIFO) queue connected downstream in said pipeline such that said ALU writes to said second FIFO queue as a virtual special purpose register (SPR);

a first network interface (INT) connected to feed communication data packets to said first FIFO to be read directly by said ALU; and a second network interface (INT) connected to receive communication data packets directly from said second FIFO queue after output by the ALU, wherein said ALU reads and writes said communication data packets directly to said first FIFO queue and from said second FIFO queue, respectively, bypassing the main memory and the CPU bus, and wherein said RISC processor is augmented with special load/store instructions to manipulate said first and second FIFO queues.

8. A communications interface directly coupled to the execution pipeline of a reduced instruction set computer (RISC) as recited in claim 7 wherein said ALU reads said first FIFO queue in response to one of a polling, a normal interrupt, and a vector interrupt.

9. A communications interface directly coupled to the execution pipeline of a reduced instruction set computer (RISC) as recited in claim 7 wherein the communication packets comprise multiple words filling said first FIFO queue.

10. A communications interface directly coupled to the execution pipeline of a reduced instruction set computer (RISC) as recited in claim 9 wherein the communication packets comprise multiple words filling said second FIFO queue.

* * * * *